Sept. 3, 1940.　　　　E. J. BARRY　　　　2,213,894
SOLAR WATER HEATER
Filed Oct. 24, 1938
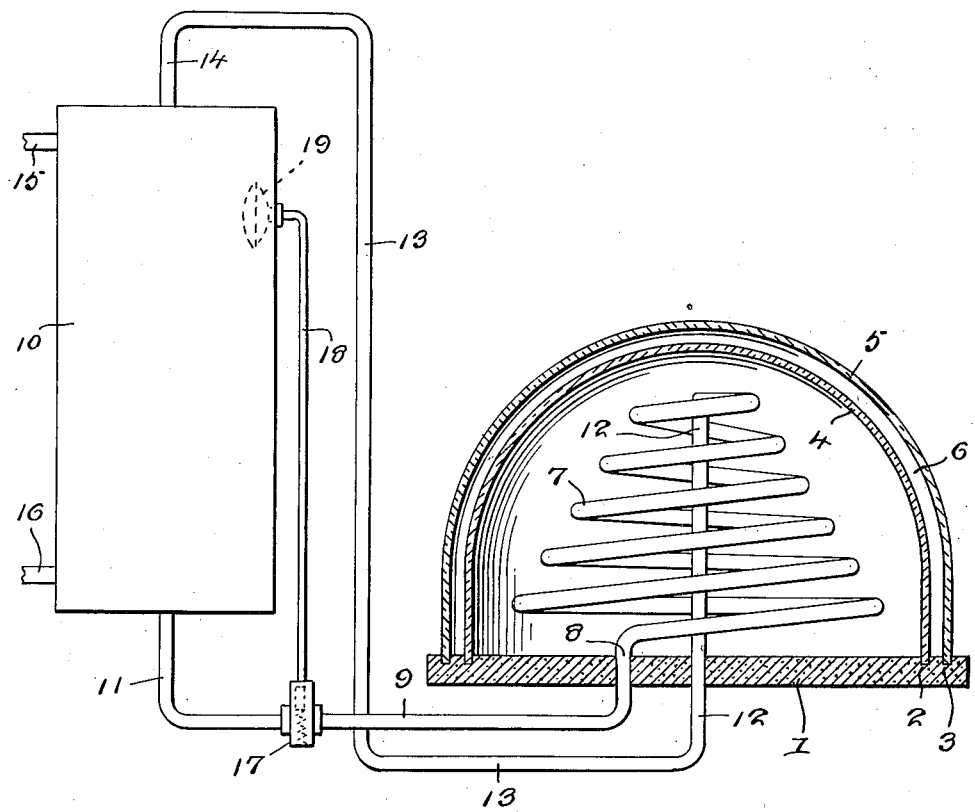
Edward J. Barry
INVENTOR
BY Victor J. Evans & Co.
ATTORNEYS

Patented Sept. 3, 1940

2,213,894

UNITED STATES PATENT OFFICE

2,213,894
SOLAR WATER HEATER

Edward J. Barry, Orlando, Fla., assignor of forty-five one-hundredths to Ervin T. Brown, Winter Park, Fla.

Application October 24, 1938, Serial No. 236,718

2 Claims. (Cl. 126—271)

This invention relates to solar water heaters and has for its main object to provide an apparatus or device of this character which is effective and highly efficient in utilizing the rays of the sun in heating water for various domestic and commercial uses.

A particular object is to provide an improved solar heating unit which is simple and compact, and of a peculiar form whereby to more effectively concentrate the sun's rays upon a contained water heating and circulating coil and at the same time effectively retain the absorbed heat within the casing of the unit.

A further object is to provide an automatic thermal control for the water circulation to and from the storage tank in connection with the heating unit.

With the foregoing and other objects and advantages to be attained, as will hereinafter more fully appear, the invention consists in the general structural form and arrangement of an apparatus and in the particular parts thereof as hereinafter described and set forth with particularity in the appended claims, reference being had to the accompanying drawing, in which the sole figure illustrates a practical adaptation of the invention.

Referring now to the drawing, the numeral 1 designates the insulated bottom of the heating unit, said bottom being either a board or plate which is solid throughout and made of asbestos or any other suitable heat insulative material, or specially constructed in any approved manner for the purpose intended. As shown, the bottom 1 is provided with a spaced pair of annular grooves 2, 3, near its periphery, in which grooves are fitted annular inner and outer semi-spherical or dome-like shells 4 and 5 respectively, said shells being made of glass or other suitable transparent material with a dead-air space 6 therebetween and throughout the entire extent thereof.

Within the inner shell 4 is an upwardly tapered or substantially conical coil 7 of metal piping of high heat conductivity, preferably copper, said coil being painted or otherwise suitably colored black whereby to make the coil non-reflective so as not to detract from its heat absorptive qualities while the top face of the bottom member 1 is painted or colored white or some other reflective color.

The lower end of the coil 7 is the inflow end thereof and it is connected by a downward extension 8 thereof, through the bottom 1 to a conducting pipe 9, which latter is in turn connected communicably into the bottom of a water storage tank 10, as at 11. The upper outflow end of the coil 7 has a downward axial extension 12 which passes through the bottom 1 and is connected to a pipe 13, which latter is in turn communicably connected to the upper end of the storage tank 10, as at 14.

In practice, the storage tank 10 and the water circulating pipes 9 and 13 connecting the tank and the heating coil 7 are obviously insulated throughout the entire extent thereof so as to prevent undue dissipation of the heat within. The tank is also provided with service pipes 15 and 16, as conventionally shown, but which may be in any desired or approved arrangement for supplying water to the tank and for conducting the heated water to the particular utility which is to be supplied with heated water from the tank.

In use, the heating unit is placed conveniently where it is exposed to the sun's rays which pass through the spaced dome-like shells 4 and 5 and are concentrated upon the upwardly tapered coil 7, which being made of metal piping of high heat conductivity and absorptive character, which quality is enhanced by the blackening of the upper surface of the coil, the water within the coil becomes heated to a high degree and flows under pressure from the coil into the tank 10 through the pipe connection 13, the circulation being completed through the pipe connection 9 between the bottom of the tank and the inflow end of the coil. The reflective top surface of the bottom 1 of the heating unit adds materially to the heating effect of the sun's rays upon the coil 7, and while the sun's rays are transmitted freely through the dome-like shells 4 and 5, the dead air space 6 therebetween affords an effective non-conductive insulation which confines and retains the absorbed heat within the inner chamber in which the coil is located.

Preferably, a thermostatic valve 17 is provided in the pipe connection 9 between the inflow end of the coil 7 and the bottom of the storage tank 10. This valve being of an obvious or approved construction and operation, is merely shown in conventional form in the drawing, in which illustration the valve casing is connected by a pipe or tube 18 of small diameter to a suitable thermal controlling element 19 located within the upper portiono of the storage tank 10 and also illustrated merely in a conventional manner. With this provision, when the temperature of the water within the storage tank 10 reaches a predetermined degree, the thermal element 19 is accordingly affected and effects the closing of the valve 17 so that the flow from the tank 10 to the heating coil 7 is automatically cut off until such time as the temperature within the tank 10 decreases sufficiently to permit the re-opening of the valve 17. This prevents overheating of the water within the storage tank 10, and in this connection it is noted that, although there may be water in the coil 7 at the time the valve 17 is closed, no harm can result therefrom, because the water left in the coil may only turn into steam and escape into the upper portion of the storage tank where it is harmless.

The solar water heater of the present invention is ideally adaptable in the heating of water for general purposes in a latitude where the climatic conditions permit, the use being either domestic or commercial and in a variety too numerous for specific mention herein.

While the particular apparatus illustrated in the accompanying drawing embodies a practical adaptation of the invention, it is obvious that considerable modification and alteration may be made therein without departing from the spirit and scope of the invention as defined by the appended claims. The invention, therefore, is not limited to the specific construction and arrangement shown.

What is claimed is:

1. In a solar water heater, a storage tank, a chambered heating unit including a heat insulating flat base and a dome-like cover on said base, said cover comprising spaced inner and outer shells of material diathermanous to the sun's rays but athermanous to heat within the inner shell, a coil within the inner shell, said coil being upwardly tapered and made of metal piping of high heat conductivity and absorptive character, the upper end of the coil being the outflow end and having an axial downwardly extending pipe extension through the base of the unit, the lower end of the coil being the inflow end and having a downward extension through said base, a pipe connection between the outflow extension of the coil and the upper portion of the storage tank, a pipe connection between the inflow extension of said coil and the bottom of the tank, a flow controlling valve in said second named pipe connection, and thermally responsive means within said storage tank for controlling said flow controlling valve.

2. In a solar water heater, a unitary chambered structure comprising a flat heat insulating base having a reflective top surface and a rounded domelike covering comprising correspondingly formed and symmetrically spaced inner and outer shells of material which is diathermanous to solar rays but athermanous to heat within the inner chamber of the unit, and an upwardly tapered coil within the inner shell, said coil comprising tubing the material of which is of high heat conductivity and absorptive character, the lower end of the coil being the inflow end and extended downwardly through the base of the unit and the upper end of the coil being the outflow end and having an axial downwardly extending tubular extension through the base of the unit.

EDWARD J. BARRY.